US008004521B2

(12) United States Patent
Falchetto

(10) Patent No.: US 8,004,521 B2
(45) Date of Patent: Aug. 23, 2011

(54) GRAPHIC RENDERING METHOD AND SYSTEM COMPRISING A GRAPHIC MODULE

(75) Inventor: Mirko Falchetto, Milzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1044 days.

(21) Appl. No.: 11/833,896

(22) Filed: Aug. 3, 2007

(65) Prior Publication Data

US 2008/0170066 A1    Jul. 17, 2008

(30) Foreign Application Priority Data

Jan. 12, 2007  (IT) .............................. MI07A000038

(51) Int. Cl.
*G06T 15/40* (2006.01)
(52) U.S. Cl. ........................................ 345/422; 345/424
(58) Field of Classification Search .................... 345/422
See application file for complete search history.

(56) References Cited

U.S. PATENT DOCUMENTS

| 5,854,631 | A  | * | 12/1998 | Akeley et al. ............... 345/419 |
| 6,628,836 | B1 | * | 9/2003  | Wittenbrink et al. ......... 382/232 |
| 6,646,639 | B1 | * | 11/2003 | Greene et al. ............... 345/422 |
| 6,828,978 | B2 | * | 12/2004 | Buehler ...................... 345/543 |
| 7,310,098 | B2 | * | 12/2007 | Ohba ......................... 345/428 |
| 2001/0055012 | A1 | * | 12/2001 | Lewis et al. ............... 345/418 |

FOREIGN PATENT DOCUMENTS

EP    1496704 A1    1/2005

OTHER PUBLICATIONS

Allard, J. et al. "A Shader-Based Parallel Rendering Framework" In: IEEE Visualization 2005 (Nov. 21, 2005), pp. 127-134.*
Falchetto, M. et al. "Sort Middle Pipeline Architecture for Efficient 3D Rendering." In: International Conference on Consumer Electronics (Jan. 14, 2007), pp. 1-2.*
Fuchs et al., "Pixel-Planes 5: A Heterogeneous Multiprocessor Graphics System Using Processor-Enhanced Memories," Computer Graphics, vol. 23, No. 3, Jul. 1989, pp. 79-88.
Moller et al., "Real Time Rendering," AK Peters Publishers, 1999, pp. 7-23.
Molnar et al., "A Sorting Classification of Parallel Rendering," IEEE Computer Graphics, vol. 14, No. 4, Jul./Aug. 1994, pp. 23-32.
Watt, "Fundamentals of Three-dimensional Computer Graphics," Addison-Wesley Publishing Company, Reading, Mass., 1991, pp. 97-113.
Munshi, "OpenGL ES Common/Common-Lite Profile Specification," Version 1.1.04 (Annotated), The Khronos Group Inc., 2004, 123 pages.
Segal et al., "The OpenGL Graphics System: A Specification (Version 1.5)," Silicon Graphics, Inc., 2003, 333 pages.
"Quake III Arena," ID Software Inc., 1999, URL=ftp//ftp.idsoftware.com/idstuff/quake3/win32/q3ademo.exe, download date Feb. 17, 2011.

* cited by examiner

*Primary Examiner* — Xiao M Wu
*Assistant Examiner* — Scott E Sonners
(74) *Attorney, Agent, or Firm* — Lisa K. Jorgenson; Timothy L. Boller; Seed IP Law Group PLLC

(57) ABSTRACT

A graphic rendering method includes: providing data primitive representing primitives of a scene; defining a plurality of three-dimensional cells of a scene view frustum; ordering the cells according to an order based on cell depths from a reference plane; associating each primitive to a cell; and processing data primitives according to the cell order to renderize the scene.

39 Claims, 12 Drawing Sheets

GRAPHIC RENDERING METHOD AND SYSTEM COMPRISING A GRAPHIC MODULE

BACKGROUND

1. Technical Field

The present invention relates to the technical field of the graphic rendering and, particularly, to the 3D (three-dimensional) rendering. More particularly, the present invention can be applied to the sort-middle technique.

2. Description of the Related Art

Computer graphics is the technique of generating pictures with a computer. Generation of pictures, or images, is commonly called rendering. Generally, in three-dimensional (3D) computer graphics, geometry that represents surfaces (or volumes) of objects in a scene is translated into pixels and then displayed on a display device.

In computer graphics the each object to be rendered is composed of a number of primitives. A primitive is a simple geometric entity such as, e.g., a point, a line, a triangle, a square, a polygon or high-order surface.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 or in: "Real Time Rendering", by T. Moller, E. Haines, Chapter 2: The Graphics Rendering Pipeline, pages 7 to 23, published by A K Peters, 1999, ISBN 1-56881-101-2.

Two main rendering techniques are known: the traditional technique (also called "immediate mode rendering") and the sort-middle technique (also called tile-based rendering).

Document EP 1496704 describes a traditional graphic pipeline comprising an application/scene stage, a geometry stage, a triangle set up stage and a rasterizing stage. The geometry stage can perform transformations and other operations such as "lighting" and "back-face culling". In a traditional pipeline the primitives are processed in the submission order.

In accordance with the sort-middle approach a scene is decomposed into tiles which are rendered one by one. This allows the color components and z values of one tile to be stored in small, on-chip buffers, so that only the pixels visible in the final scene need to be stored in the external frame buffer. The frame buffer is a device provided with a corresponding memory which drives the display and includes color values for every pixel to be displayed on the screen.

The sort-middle rendering has been discussed by S. Molnar et al. in "A Sorting Classification of Parallel Rendering", IEEE Computer Graphics July/August 1994, Vol. 14, No. 4), pp. 23-32 and by H. Fuchs et al. in "Pixel-Planes 5: A Heterogeneous Multiprocessor Graphic System Using Processor—Enhanced Memories", Computer Graphics July 1989, Vol. 23, No 3.

BRIEF SUMMARY

The applicant observes that in rendering processing a current primitive can occlude or overlap a previous drawn primitive. Hence, a pixel on the screen can be drawn several times causing an increasing of the overdraw factor which is indicative of a ratio between the total number of pixels (or fragments) processed and written into the frame buffer and the frame buffer resolution.

It has been noticed that there is a need in the field in reducing the overdraw factor since this reduction allows to increase the bandwidth and limit the access to graphic pipeline buffers.

In accordance with a particular embodiment, a graphic rendering method comprises dividing the scene to be displayed into a plurality of three-dimensional cells ordered in accordance with their depths. The primitives of the scene are associated to a corresponding cell and are processed according to the cells order to renderize the scene.

This and other aspects of the invention will be apparent upon reference to the attached figures and following detailed description.

DETAILED DESCRIPTION

Figure 1:
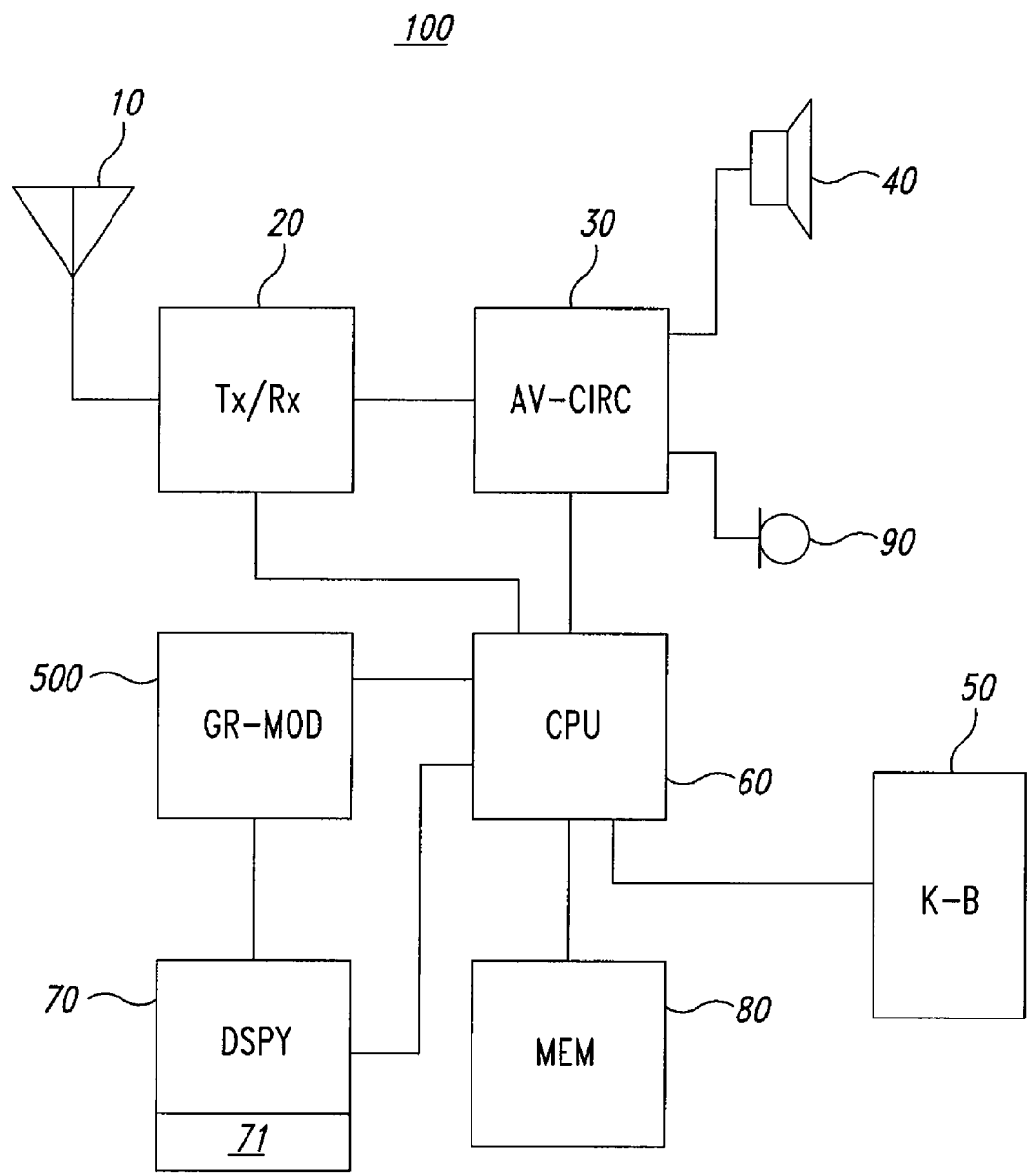
FIG. 1 shows a graphic system in accordance with an embodiment of the invention.

FIG. 1 shows a graphic system 100 according to an embodiment of the invention and comprising a graphic module 500 (GR-MOD). The graphic system 100 illustrated in FIG. 1 is a mobile phone, but in accordance with further embodiments of the invention, graphic system 100 can be another system such as a personal digital assistant (PDA), a computer (e.g., a personal computer), a game console, a car navigation system, a set top box (STB), etc.

As an example, the mobile phone 100 can be a cellular phone provided with an antenna 10, a transceiver 20 (Tx/Rx) connected with the antenna 10, an audio circuit unit 30 (AU-CIRC) connected with the transceiver 20. A speaker 40 and a microphone 90 are connected with the audio circuit unit 30.

The mobile phone 100 is further provided with a CPU (central processing unit) 60 for controlling various functions and, particularly, the operation of the transceiver 20 and the audio circuit unit 30 according to a control program stored in a system memory 80 (MEM), connected to the CPU 60. Graphic module 500 is coupled to and controlled by the CPU 60. Moreover, mobile phone 100 is provided with a display unit 70 provided with a corresponding screen 71 (e.g., a liquid crystal display, DSPY), and a user interface 50, such as an alphanumeric keyboard (K-B).

The graphic module 500 is configured to perform a set of graphic functions to render an image on the screen 71 of the display 70. Preferably, the graphic module 500 is a graphic engine configured to rendering images, offloading the CPU 60 from performing such task. As used herein, the term "graphic engine" means a device which performs rendering in hardware or software not running on a CPU, but on another coprocessor such as a DSP (digital signal processor). The terms "graphic accelerator" and "graphic coprocessor", also employed in the field, are equivalent to the term "graphic engine."

Alternatively, the graphic module 500 can be a graphic processing unit (GPU) wherein the rendering functions are performed on the basis of hardware and software instructions executed on a dedicated processor such as a DSP. In accordance with a further embodiment, some or all the rendering functions are performed by the CPU 60.

Figure 2:
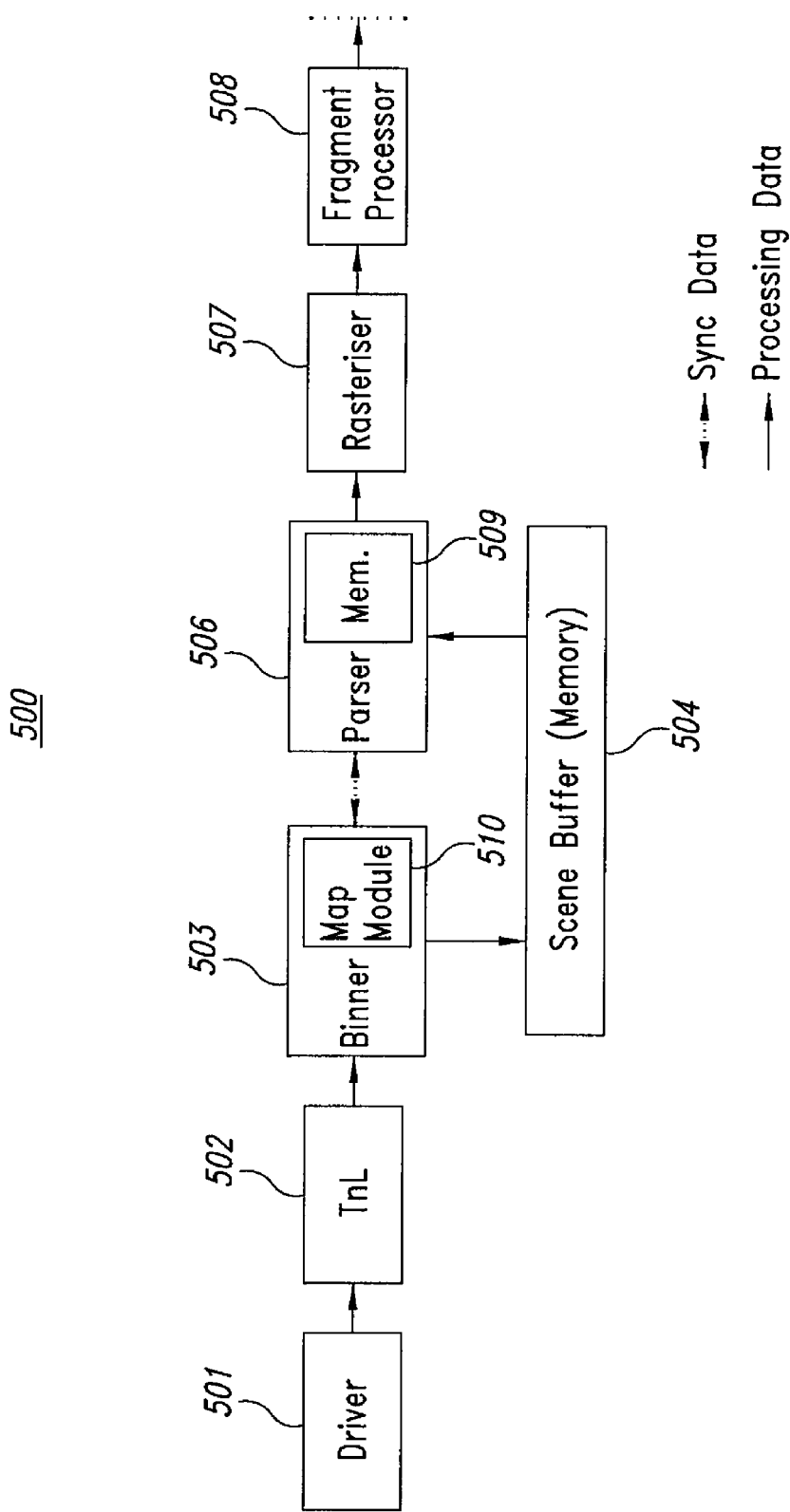
FIG. 2 shows an example of graphic module in accordance with a particular embodiment of the invention.

FIG. 2 is a block diagram of the graphic module 500. Graphic engine 500 can perform the rendering of 3D (three dimensional) scenes, that are displayed on the screen 71 of the display 70. Particularly, the graphic engine 500 can operate according to a sort-middle rendering approach (also called "tile based" rendering).

In accordance with the sort-middle rendering, the screen 71 of the display 70 is divided in a plurality of 2D (two dimensional) ordered portions (i.e., 2D tiles) such as, for example, square tiles. As an example, the screen is divided into 2D tiles having size 16×16 pixels or 64×64 pixels.

The graphic engine 500, illustrated in FIG. 2, comprises a driver 501, a geometry stage 502 (also known as TnL stage—Transform and Lighting stage), a binner stage 503, and a parser stage 506.

The driver 501 is a block having interface tasks and is configured to accept commands from programs (e.g., application protocol interface—API) running on the CPU 60 and then translate them into specialized commands for the other blocks of the graphic engine 500.

The geometry stage 502 is configured to process primitives and applying transformations to them so as to move 3D objects. As defined above, a primitive is a simple geometric entity such as, e.g., a point, a line, a triangle, a square, a polygon or high-order surface. In the following, reference will be often made to triangles, which can be univocally defined by the coordinates of their vertexes, without other types of employable primitives.

Figure 3:
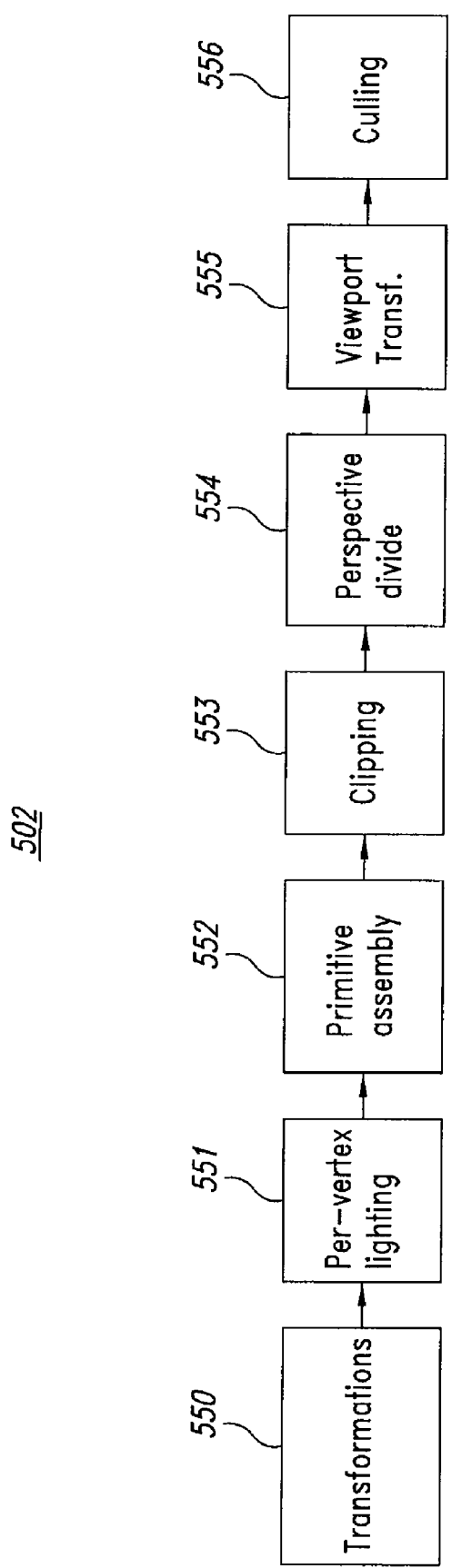
FIG. 3 shows an example of a geometry stage employable in said graphic module.

FIG. 3 shows a particular embodiment of the geometry stage 502 which includes a transformation stage 550. The transformation stage 550 is configured to apply geometric transformations to vertices of the primitives in each single object of the scene to transform primitive from a user space to a screen space. As an example, transformations are of the affine type and defined in a affine space where two entities are defined: points and vectors. Results of transformation are vectors or points.

The transformations are grouped in two main families, i.e.:
affine transforms: an affine transform is one which preserves collinearity between points and ratios of distances along a line;
projective transforms: they do not preserve sizes or angles but do preserve incidence and cross-ratio. A projective transformation can also be called a projectivity.
Both of these transformations can be represented, as an example, by known square 4×4 arrays. Each transformation can be obtained by properly defining each coefficient in such arrays. Moreover the Projective transform needs an extra divide operation performed by a "perspective divide" stage described later.

Moreover, the particular geometry stage 502 described comprises: a lighting stage 551, a primitive assembly stage 552, a clipping stage 553, a "perspective divide" stage 554, a viewport transformation stage 555 and a culling stage 556.

The per-vertex lighting stage 551 applies light to the primitives depending on a defined light source and suitably adjusts the primitive colors vertexes in such a way to define the effect of the light. The primitive assembly stage 552 is a stage that allows to reconstruct the semantic meaning of a primitive so as to specify the primitive type i.e., specifying if a primitive is a triangle, a line or a point and so on.

The clipping stage 553 allows to remove the primitives that are outside the screen 71 (non-visible primitives) and converting the primitives that are placed partially out of the screen 71 into primitive which are fully visible. The perspective divide stage 554 is adapted to apply a projective transformation dividing each transformed coordinate value for a coefficient w computed during the transform operation as well.

The viewport transformation stage 555 is configured to apply a further coordinates transformation which takes into account the screen resolution. The back-face culling stage 556 has the task of removing the primitives oriented in a direction opposite to the observer and its operation is based on a normal direction associated with each primitive.

Turning back to FIG. 2, the binner stage 503 is adapted to acquire from the geometry stage 502 primitive coordinates and associate them with each tile of the screen 71. In the example shown in FIG. 2, the binner stage 503 includes a mapping module 510 dedicated to a mapping function that will be described in detail later. The binner stage 503 is coupled to a scene buffer 504 which is a memory able to store information provided by the binner stage 503. As an example, the scene buffer 504 is a memory external to the graphic module 500 and can be the memory system 80 illustrated in FIG. 1.

The graphic module 500 further includes a parser stage 506, a rasterizer stage 507 and a fragment processor 508 which is coupled to the display 70. The parser stage 506 is responsible for reading, for each tile, the information stored in the scene buffer 504 and passing such information to the following stages also performing a primitive reordering operation.

As it will be clear in the following, the parser stage 506 generates an ordered display list which is stored, in temporary way, in a parser side memory 509. The parser stage 506 is suitably coupled to the scene buffer memory 504 in order to read its content and is coupled to the binner stage 503 to receive synchronization signals.

According to one embodiment, the parser side memory 509 may be an on-chip memory, which allows a fast processing. As an example, the parser side memory 509 is integrated on the same chip on which the parser stage 506 has been integrated and, e.g., shows a capacity of 8 kB.

The rasterizer stage 507 is configured to perform processing of primitive data received from the parser stage 506 so as to generate pixel information images such as the attribute values of each pixel. The attributes are data (color, coordinates position, texture coordinate etc.) associated with a primitive. As an example, a triangle vertex has the following attributes: color, position, coordinates associated with texture. As known to the skilled person, a texture is an image (e.g., a bitmap image) that could be mapped on the primitive.

The fragment processor 508 performs a set of operations on a fragment produced by rasterizer 507 to produce a color to be written into the display memory 70.

In operation, the user of the mobile phone 100 employs the keyboard 50 in order to select a 3D graphic application, such as a video game. As an example, such graphic application allows to show on the screen 71 several scenes. The scenes correspond to what is visible for an observer who can move assuming different positions. Accordingly, a software module corresponding to said graphic application runs on the CPU 60 and active the graphic module 500.

A 3D scene to be rendered is included in a region of space, called view frustum VF (FIG. 4), having a near plane 41 (corresponding to the screen 71) and a far plane 42.

Figure 5:
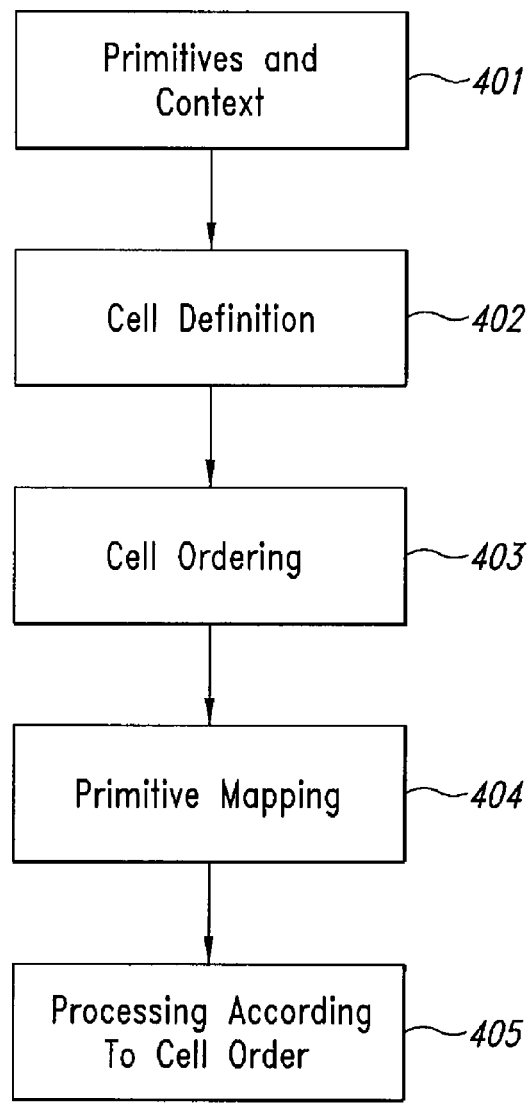
FIG. 5 shows a flow chart illustrating an example of a graphic rendering method.

FIG. 5 shows, by means of a flow chart, a graphic rendering method 1000, in accordance with a first embodiment of the invention. Particularly, the graphic rendering method 1000 can be performed by the graphic module 500.

In a step 401, the geometry stage 502 provides to the binner stage 503 primitives data and, particularly, coordinates defining the primitives (such as coordinates of triangles vertexes) resulting from the processing carried out by the stages of FIG. 3, which are clear to the skilled person.

Particularly, the data associated with primitives further includes context data. As clear to the skilled person, context data defines the set of operations to be carried out on the primitive data by the pipeline included in the graphic module 500.

The primitives data are submitted to the binner stage 503 according to a submission order which depends on the game application and the user's actions.

In a step 402, the binner stage 503 defines a plurality of three-dimensional cells (such as the cell T1C1 shown in FIG. 4) included in the scene view frustum VF. Moreover, the binner stage 503 orders (403) the plurality of cells according to an order based on cell depths (i.e., the z coordinate) from a reference plane such as, for example, the screen 71 lying on the near plane 41.

In a step 404, the binner stage 503 performs a mapping of the incoming primitives by associating each primitive with a cell. The mapping of the primitives into ordered cells allows to substantially reorder the primitive in a way that can be different from the submission order but which is a consequence of the primitive depth.

Starting from the result of the mapping, the graphic module 500 performs a processing (405) of the primitives data according to the cell order. The processing 405, which can be carried out by the parser stage 506, the rasterizer 507 and the fragment processor 508, allows to render the scene.

Particular embodiments of the method 1000 will be described herein below. The operation of the driver 501 and the geometry stage 502 are clear from the above description made with reference to FIG. 2 and FIG. 3 and does not need further explanations.

Figure 4:
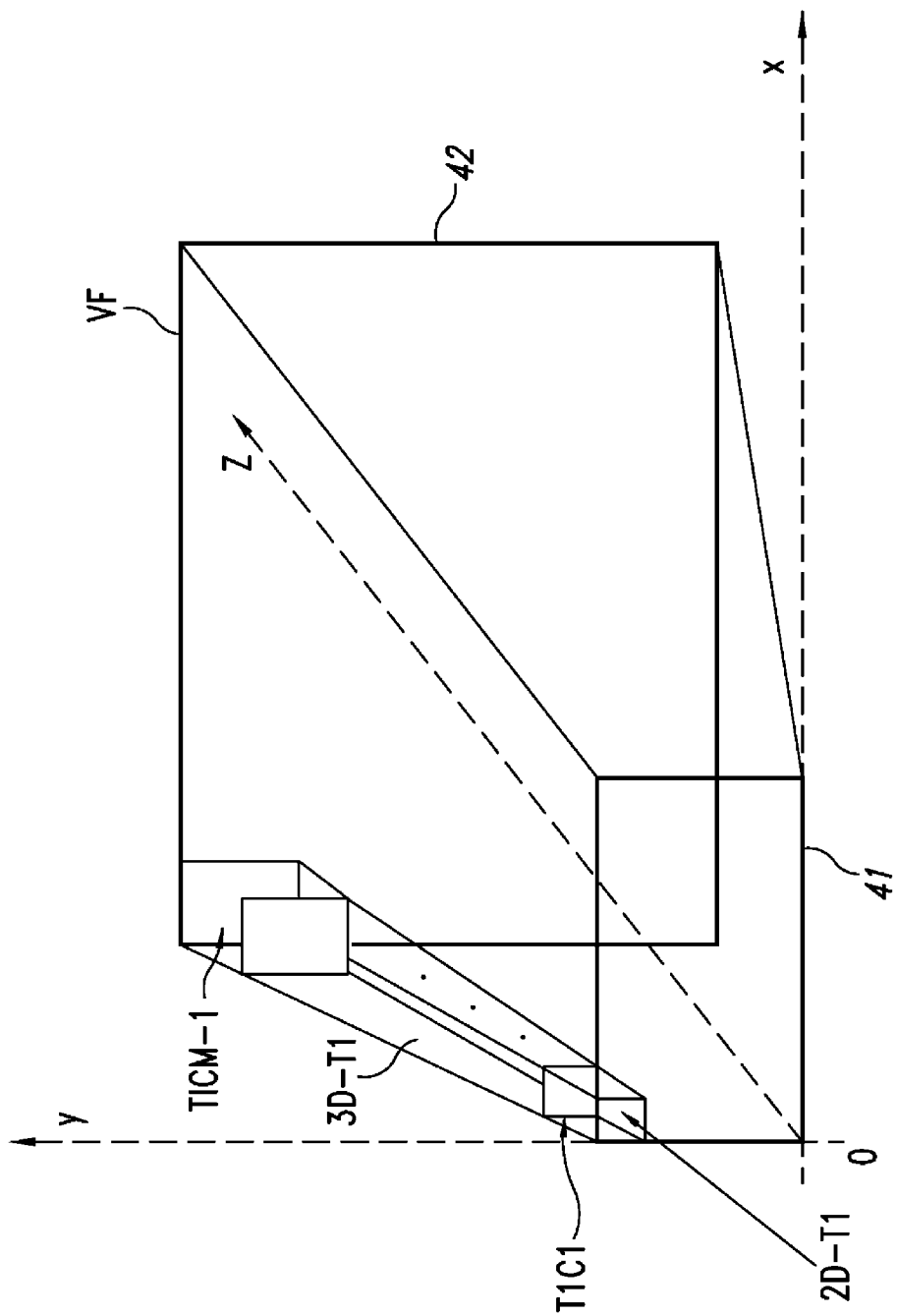
FIG. 4 shows a view frustum divided into cells.

As regards cell definition 402 (FIG. 5), it has to be observed that according to the sort-middle approach, the screen 71 is divided into a plurality of 2D tiles (only 2D tile 2D-T1 is indicated in FIG. 4). The view frustum VF is operatively subdivided in space regions, e.g., 3D tiles, each defining on the screen 71 a corresponding 2D tile. As an example, the 3D tile 3D-T1 defines on the screen 71 the 2D tile 2D-T1. FIG. 4 also illustrates x, y and z axes of a Cartesian reference system (having origin O), wherein the z axis corresponds to the depth component.

In greater detail, the binner stage 503 divides each 3D tile into a plurality of M discrete quantization cells along the z axis. The cells are 3D portions of a 3D tile. In accordance with the example shown in FIG. 4, the 3D tile 3D-T1 is divided in M cells: T1C0, T1C1, . . . T1Ci, T1CM−1.

In accordance with the described example, the cells ordering 403 is performed by the binner stage 503 by associating with each cell an index cell ID identifying the cell and which is comprised between 0 and M−1. The index cell ID increases with the depth increasing. The other 3D tiles included into the view frustum VF are divided in an analogous manner.

Figure 6:
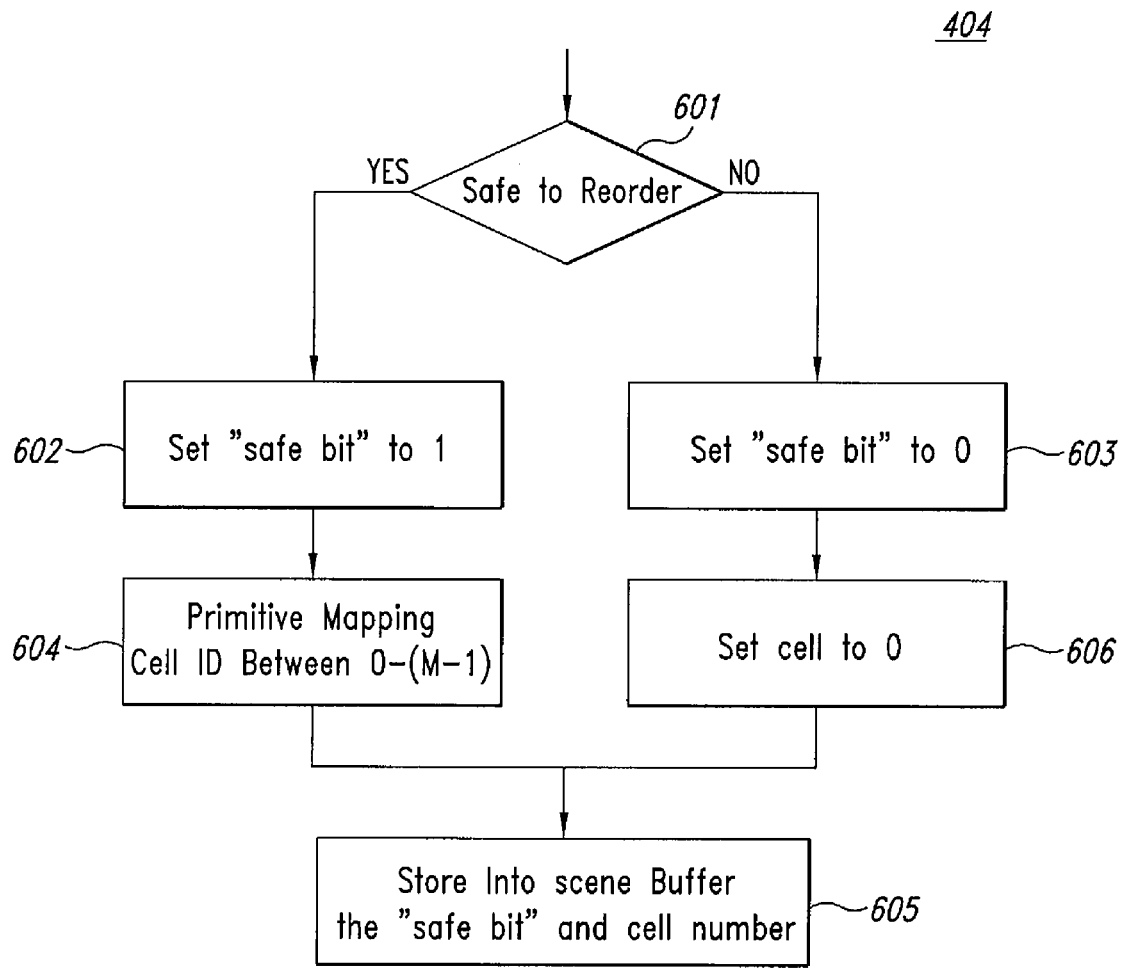
FIG. 6 shows a flow chart illustrating a particular example of a mapping step employable by said graphic rendering method.

FIG. 6 shows a first example of implementation of the primitive mapping 404.

According to this example, the binner stage 503 performs a safe reordering check 601, wherein each incoming primitive is checked to determine whether it is safe to map the incoming primitive or, on the contrary, it is safe to maintain the original submission order since the reordering following the mapping can alter the final rendered scene.

Particularly, this check can be based on at least part of the context data associated with each primitive and, particularly, it can have the aim of maintaining the compliancy with the OpenGL ES standard in such a way that the described reordering method produces the same rendered scene compared to a classical OpenGL ES pipeline.

As an example, the safe reordering check 601 verifies whether the particular primitive to be mapped has a depth value defined. If the depth value is not defined the mapping is not safe and will not be carried out.

Moreover, the safe reordering check 601 can verify if a test based on depth values is enabled in the graphic module 500. Particularly, the safe reordering check 601 checks whether the depth test or analogous tests is enabled. If a depth test is enabled the primitive can be mapped. As known to the skilled person a depth test allows to avoid displaying a current pixel, which has the same x,y coordinates of a precedent pixel (overlapping pixels) but a depth value that, according to a user specified depth function, classifies this pixel as "not visible". The depth values are stored in a corresponding depth buffer (not shown).

In accordance with another embodiment, the safe reordering check 601 also verifies that a depth mask (as defined by the OpenGL ES standard) is enabled. As known to the skilled person, the depth mask is a function that allows to decide whether information regarding a particular pixel has to be stored in the depth buffer. The mapping is safe when the depth mask is enabled (i.e., the updating of the depth buffer is enabled).

In addition, according to another particular embodiment, the safe reordering check 601 can verify whether a stencil test and/or a color blend function are disabled. As known to the skilled person, a stencil test allows to reject or admit fragments in accordance with a stencil value stored in a stencil buffer. The color blend function allows to manage the transparent primitive and render correctly translucent surfaces (e.g., water, glass, etc.). The mapping will be carried out whether the stencil test and the color blend function are disabled.

According to a specific embodiment which preserves compliance with the OpenGL ES 1.1 specification, the safe reordering check 601 checks whether all the condition above indicated are verified, i.e., summarizing:
the primitive has a depth value defined;
depth test is enabled;
depth mask is enabled;
stencil test is disabled; and
color blend is disabled.

As an example, which meets OpenGL ES 1.1 specification, at least the depth value definition can be carried out if a depth function is defined. Particularly, the employable depth function is one of these known functions: Less, LessEqual, Greater or GreaterEqual. According to the safe reorder check 601, transparent primitives are not mapped and reordered.

According to a particular embodiment of the invention, following the safe reordering check 601 the binner stage 503 associates to a primitive a "safe" information (as an example, a bit) indicating the result of the check. Particularly, when the safe reordering check establishes that the reordering can be safely carried out (branch YES in FIG. 6) the safe bit is set to 1 (602) and this bit is set to 0 (603) in the opposite situation (branch NO in FIG. 6). With reference to the primitives for which the reordering can be made safely, the mapping 605 of such primitives is performed by, as an example, the mapping module 510.

As indicated above, the binner stage 503 has acquired all the coordinates defining each cell of each 3D tile and have associated to said cell a corresponding index cell ID that univocally defines the position of a particular 3D tile 3D-T1 (FIG. 4) along the z axis of the depth component. With reference to the 3D tile 3D-T1 (FIG. 4), the cell T1C0 is the one nearest to the screen 71 while the cell T1CM-1 is the furthest one. Particularly, the cells show the same depth size d. Suitable value of the quantity M is, for instance, 16384.

Moreover, the mapping module 510 maps any primitive inside a cell by associating (604) a primitive with a single cell identified by a single index cell ID. Particularly, the mapping module 510 of the binner stage 503 performs the mapping of each primitive basing on at least one depth value of the primitive and the coordinates (at least along the z axis) that define the cells.

Generally, each primitive is associated to a tile 3D-T1 cell with which the primitive geometrically interferes, according to a mapping algorithm whose inputs are the primitive vertexes coordinates. As an example, the depth value of the primitive involved in the mapping algorithm is the minimum depth coordinate value or the maximum depth coordinate value of (vertexes of) the primitive. Examples of mapping algorithms which can be employed according to the invention will be described later.

Thanks to the mapping association 604, the primitives are at least partially reordered according to a front-to-back order based on the primitive depth. Particularly, the primitives associated with a cell Ci precede, in accordance with the established order, the primitives associated with another cell Cj, wherein i<j. It has to be observed that primitives belonging to the same cell are still ordered in accordance with the submission order and therefore the reordering could be a partial reordering.

Following the association 604, the binner stage 503 performs a storing 605 into the scene buffer 504 (FIG. 2) of the primitives coordinates (for example, the coordinates of the triangle vertexes), the attributes (e.g., the texture coordinates, colors), the contexts, the associated cell indexes and the safe bit (e.g., 0 or 1). It is observed that, advantageously, the cells coordinates are not stored in the scene buffer 504 so as to save memory space.

As regards a primitive for which a safe bit 0 has been set, this primitive is directly associated (606) with a cell having index 0 (i.e., the nearest cell). The safe bit 0 and the cell index 0 are stored (605) in the scene buffer 504. In accordance with the embodiment described, in the scene buffer 504 is stored an unordered display list in which the primitives are not ordered in a front-to-back order but, as a consequence of the mapping step, each primitive is associated with the corresponding cell index cell ID.

Particularly, this unordered display list is generated for each tile of a complete scene, i.e., for all the 3D tiles forming a scene to be represented on the screen 71 in a corresponding frame.

Figure 7:
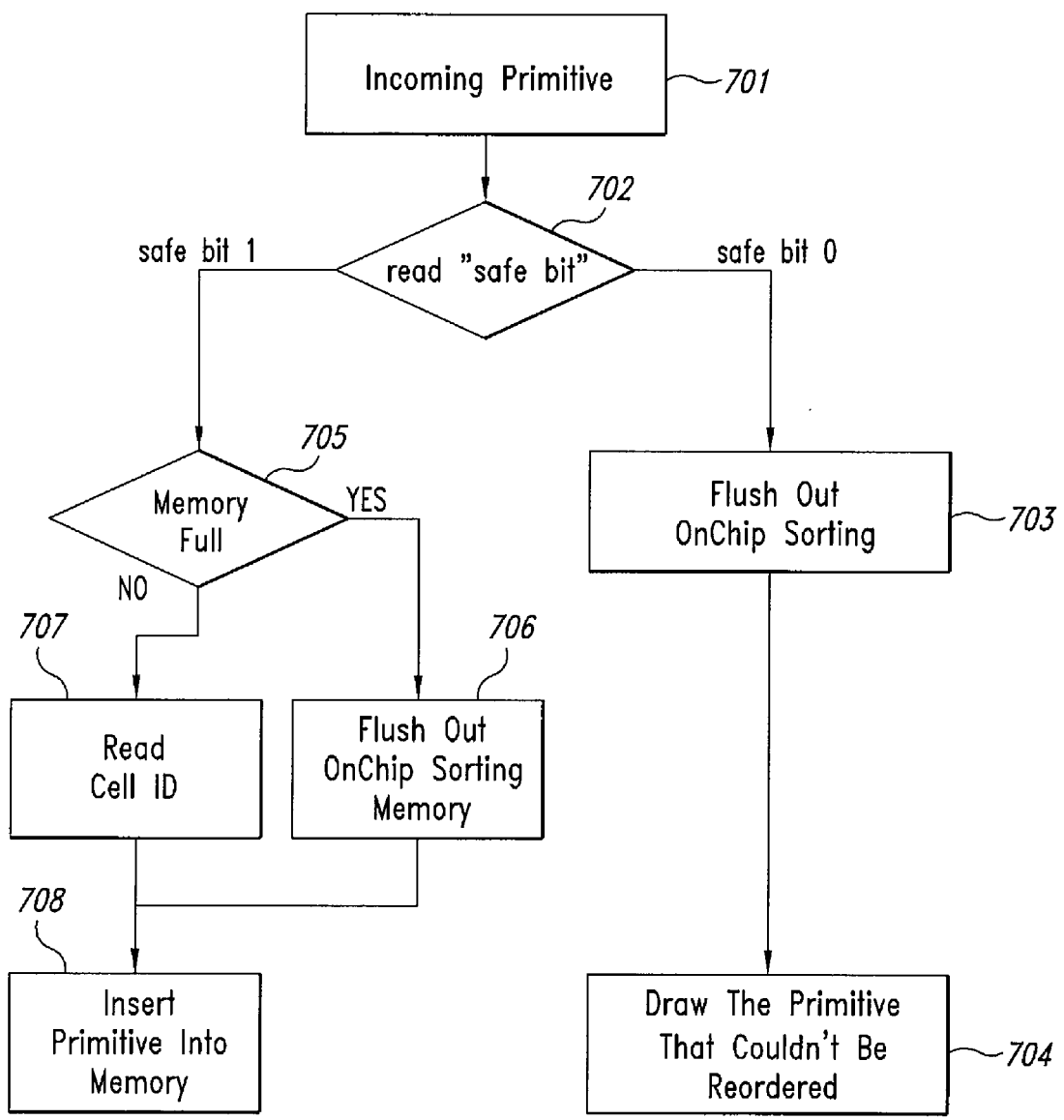
FIG. 7 shows a flow chart illustrating a particular example of a reordering method.

FIG. 7 shows another flow chart illustrating steps which can be carried out by the parser stage 506 during the processing 405 (FIG. 5). In short, parser stage 506 reads the content of the scene buffer memory 504, generates an ordered tile display list, reads back said list, and forwards it to the rasterizer stage 507.

The ordered display list can be stored in the parser side memory 509 and, as an example, includes for each primitive a corresponding pointer to geometry data, to context associated with those data, to buffer operations that affect the tile and so on. As an example, the ordered display list comprises ordered addresses identifying the cell indexes cell ID and pointers to all the primitives belonging to each cell. In the parser side memory 509 the primitives are ordered "cell by cell" according to the depth of each cell.

In greater detail, the parser stage 506 reads (701) from the scene buffer 504 the incoming primitives and reads (702) the safe bit associated with the primitives.

For a current primitive having a safe bit set at 1, indicating that the reordering should be made, the parser stage 506 checks (705) whether the parser side memory 509 is full. If the parser side memory 509 is not full (branch NO) the parser stage 506 reads (707) the respective cell index cell ID associated with the current primitive.

Then, on the basis of the read cell index cell ID the parser stage 506 inserts the data primitive into a correct position of the ordered display list.

During the reordering, the respective display list is created, collecting data from the scene buffer 504, and stored in the parser side memory 509 cell by cell for each 3D tile forming a scene. As an example, a pointer includes 32 bits.

When the parser side memory 509 is full (branch YES of step 705), the current primitive cannot be immediately inserted in the ordered display list and the parser stage 506 flushes out (706) the parser side memory 509, including the already created display list for the preceding primitives. Then, the data of the ordered display list are passed to the other stages graphic module 500 and the current primitive is suitably inserted (708) in the ordered display list to be stored in the parser side memory 509.

As regards a current primitive having associated a safe bit set at 0 (step 702), indicating that the reordering has not to be made, the parser stage 506 flushes out (703) the parser side memory 509 and transfers (704), together with data of the current primitive, such data to the other stages of the graphic module 500.

In steps 708 and 704, the parser stage 506 transfers data to be processed to the rasterizer stage 507 (as an example, tile by tile and cell by cell) according to an increasing order based on the cell index running from 0 to M−1. Particularly, for each 3D tile, firstly is processed by the rasterizer stage 506 the cell having index equal to 0 (the nearest cell), subsequently the cell having index equal to 1 and so on until the cell having index equal to M−1 is reached.

The reordering method described with reference to FIG. 5, FIG. 6 and FIG. 7 is so completed. It has to be observed that according to an alternative embodiment of the invention, the reordering can be preformed by a single stage (e.g., the parser stage 506) which carry out both the mapping and the creation of the ordered display lists.

The parser stage 506 forwards primitives to the rasterizer stage 507 in accordance with the ordered display list starting from the primitives associated to index 0 (the nearest) up to the primitives associated to index M−1 (the farthermost).

According to the embodiment of FIG. 2, the rasterizer stage 507 performs the processing of the primitive data received from the parser stage 506 so as to generate fragments information images such as the attribute values of each fragment. As an example, when the rasterizer sage 507 receives the data of a triangle vertexes performs vertex attribute interpolation to fully associate with the set of fragments belonging to such triangle the interpolated calculated attributes from the primitive vertices.

The fragment processor 508 receives from rasterizer stage 507 the fragments that belong to the processed primitives, together with the fragment attributes (e.g., color), texture coordinates and fragment depth. Particularly, the fragment processor applies the depth test by storing in the depth buffer the z coordinate of a current pixel and by comparing it with the one of the preceding pixel having the same position on the screen 71. The depth test allows to not draw the current pixel if its depth value, compared to the depth value currently stored into the depth buffer, according to the depth function chosen, is labeled as "not visible".

Since the depth test is performed on primitives that are submitted according to the corresponding cell depth order (i.e., in a front-to-back order), the depth test is particularly effective and the overdraw factor is reduced. It has been noticed that thanks to the above teachings, the overdraw factor can be reduced by a percentage ranging from 20% to 75%, depending on the scene complexity and the original submission order.

Advantageously, the fragment processor 508 does not apply any stencil test and color blend test which could contrast the results of the depth test.

With reference to synchronization aspects, the method above described, which employs a sort-middle approach, can be divided into two subsequent main steps: acquisition (or pre-processing) and processing. The pre-processing comprises all the operations carried out from the driver 501 up to the binner stage 503, which stores data in the scene buffer 504. The processing includes the operations carried out by the parser stage 506, the rasterizer stage 507 and the fragment processor 508.

In accordance with an embodiment of the invention employing the sort-middle approach, the parser stage 506 reads the data stored in the scene buffer 504 and sorts the corresponding data when it receives a synchronization signal Sync from the binner stage 503. The synchronization signal Sync informs the parser stage 506 that the operations performed by the binner stage 503 are concluded and the sorting can start.

It has to be observed that even if the above description refers to the sort-middle approach, the teachings of the invention can be applied to the immediate rendering techniques too.

Particular mapping algorithms which can be carried out in the mapping step 404 (FIG. 5) will be described herein below. A mapping algorithm allows to compute the cell index cell ID lying between 0 and (M−1). The computed cell ID value is stored in a 3D tile field of n bits together with the above mentioned safe bit. The number n is equal to ceil(log 2(M)).

In greater detail, in a first step it is determined a reference depth value z associated with each primitive. This reference depth value can be the minimum depth value or the maximum depth value. Particularly, if the depth function implemented is Greater or GreaterEqual, the minimum depth value is computed. If the depth function implemented is Less or LessEqual, the maximum depth value is computed. As an example, the reference depth value z is clamped in the range [0,1].

Figure 8:
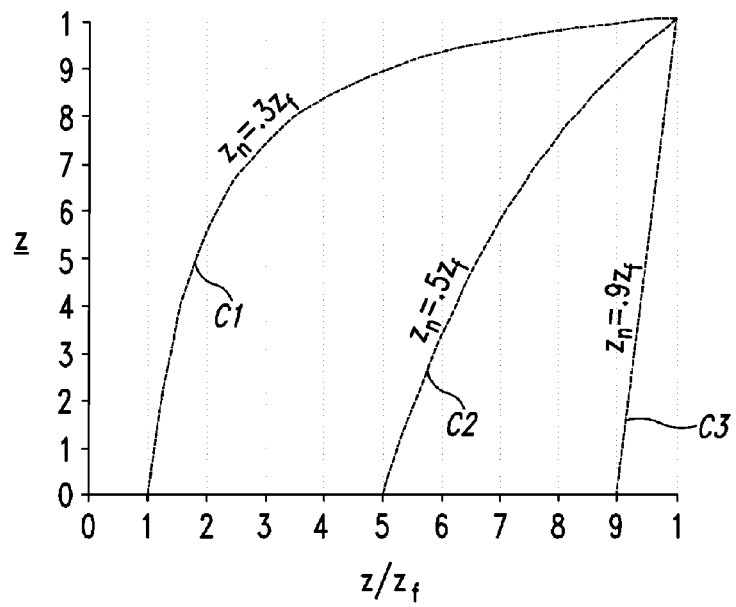
FIG. 8 shows curves indicating the behaviors of projective transformed z coordinates.

The applicants notice that the reference depth value $\bar{z}$ can be produced by a non-linear transformation carried out by the transformation stage 550 such as, for example, a projective transformation. FIG. 8 shows curves C1, C2, C3 indicating the behaviors of projective transformed z coordinates at three different values of the ratio $z_n/z_f$ which is the ratio between the coordinates of the near plane $z_n$ (71, FIG. 4) and the coordinate of the far plane $z_f$ (42). As clear from FIG. 8 the z values tends towards a hyperbolic shape that increases as the ratio $z_n/z_f$ decreases.

Figure 9:
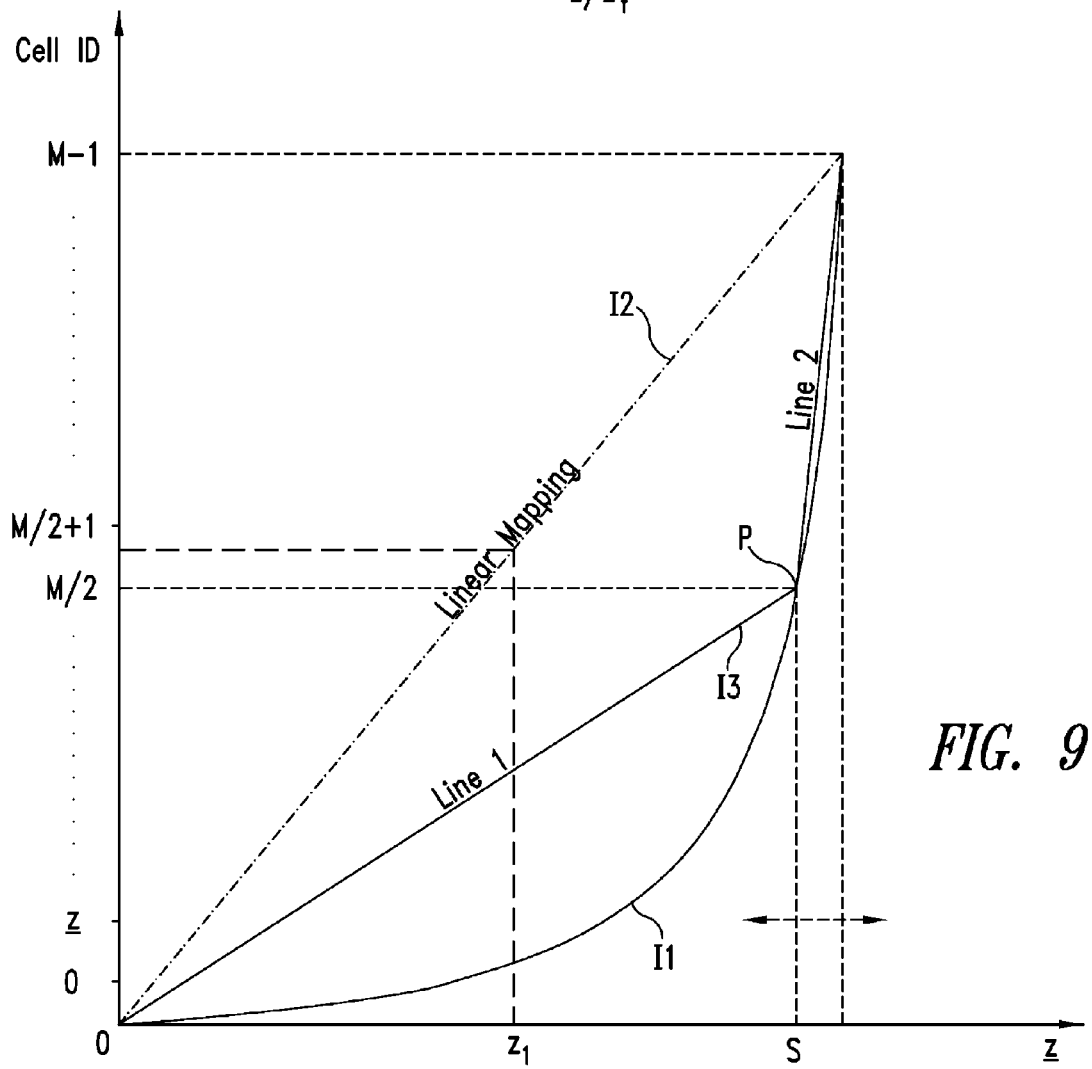
FIG. 9 shows curves employable in embodiments of primitive mapping method.

FIG. 9 shows a diagram wherein on the z axis the input depth values are represented and on the cell ID axis the cell index integers to be determined are represented. Hyperbolic curve I1 represents the behavior of the projective transformation of the ratio $z_n/z_f$. Linear curve I2 is a straight line which linearly approximates the hyperbolic curve I1.

The linear curve I2 can be used for mapping the primitives (linear mapping approach) avoiding to use the hyperbolic curves I1 which shows computing complexity. According to the linear mapping, by fixing a reference depth z1 on the z axis, the cell index can be determined basing on the corresponding value assumed by the linear curve I2 (e.g., Cell ID=(M/2)+1 at z1). It has to be noticed that by employing the linear mapping and in consideration of the non-linearity of the z quantity, in a typical application, around 80% of primitives will be mapped onto 20% of the cells available, so as to perform a reorder of low performances.

Alternatively to the linear curve I2, the hyperbolic curve I1 can be approximated by a piecewise linear comprising a plurality of straight lines (e.g., having different slopes), and therefore a N-line mapping approach is used. FIG. 9 illustrates a particular piecewise linear curve I3 having two lines, Line 1 and Line 2, which intersect each other in a point P having coordinates (M/2,S).

In accordance with a particular embodiment of the invention, the piecewise linear mapping is adaptive since the shape of the piecewise linear I3 may be changed at pre-established events. Particularly, the adaptive mapping tends to have, at every given time, a uniform mapping of the primitives.

The binner stage 503 is configured to collect a statistic on how many primitives are mapped using line p (p=1 . . . N) of the piecewise linear. As an example, the statistic is realized using N counters: at each "end of frame" or "finish" event, the points of intersection between the lines are recalculated so that, for each given line, the number of primitive mapped on that line is a constant equal to P/N where P is the total number of primitives mapped during the (previous) frame.

This update tends to maintain the mapping uniform in the range [0, M). Now, considering FIG. 9, it will explained how the algorithm operates with a two-line approximation (N=2) as the piecewise linear I3.

The algorithm is based on primitive counters count[Line1] and count[Line2] and a threshold value S, between [0, 1], for example, initially set at 0.5. If the primitive's depth value z is less than threshold S, than the cell is linearly mapped within a first range [0, M/2) (using Line1) and count[Line1] is increased by 1; otherwise the cell is linearly mapped within a second range [M/2, M) (onto Line2) and count[Line2] is increased by 1.

When an "end of frame" or a "finish" event occurs the threshold S is updated in such a way to obtain that count [Line1] is substantially equal to count[Line2], within a fixed tolerance.

For example, if at the end of the first frame count[Line1]=Co1, count[Line2]=Co2, S=Kdest, than new threshold value S' is computed as:

$$S' = S + \text{delta} \quad (1.0)$$

wherein $$\text{delta} = \begin{cases} \text{primRatio} \cdot (1-S) & \text{if primRatio} < \text{Kdest} \\ \text{primRatio} \cdot S & \text{if primRatio} >= \text{Kdest} \end{cases} \quad (1.1)$$

and:

primRatio=Kdest−(count[Line1]/(count[Line1]+count[Line2])) (1.2)

Kdest ∈ (0,1)

Putting, for instance, numbers into formulas:

Kdest=0.5, S=0.5, Co1=2000, Co2=8000

It is obtained:

primRatio=0.5−(2000/(2000+8000))=0.3 delta=0.3*(1−0.5)=0.15

S'=0.5+0.15=0.65 (New threshold)

After the update step, the counters count[Line1] and count[Line2] are reset to zero, and newly computed threshold S' is used in the mapping algorithm instead of old threshold S. The algorithm described by formulas 1.1 and 1.2 is an example of algorithms that allow to compute the threshold value S' so as to increase/decrease the indexes range of the first curve L1 when the number corresponding to count[Line1] is lower/higher than the number corresponding to count[Line2].

Experimental results shows that, after few frames (usually 10-30), S' tends towards a stable value TS, that depends on application (in Quake III Game TS~0.99), for which primRatio is stable around zero value, and half of the primitives are mapped between [0, M/2] and half between [M/2, M), obtaining a substantially uniform output distribution.

Figure 10:
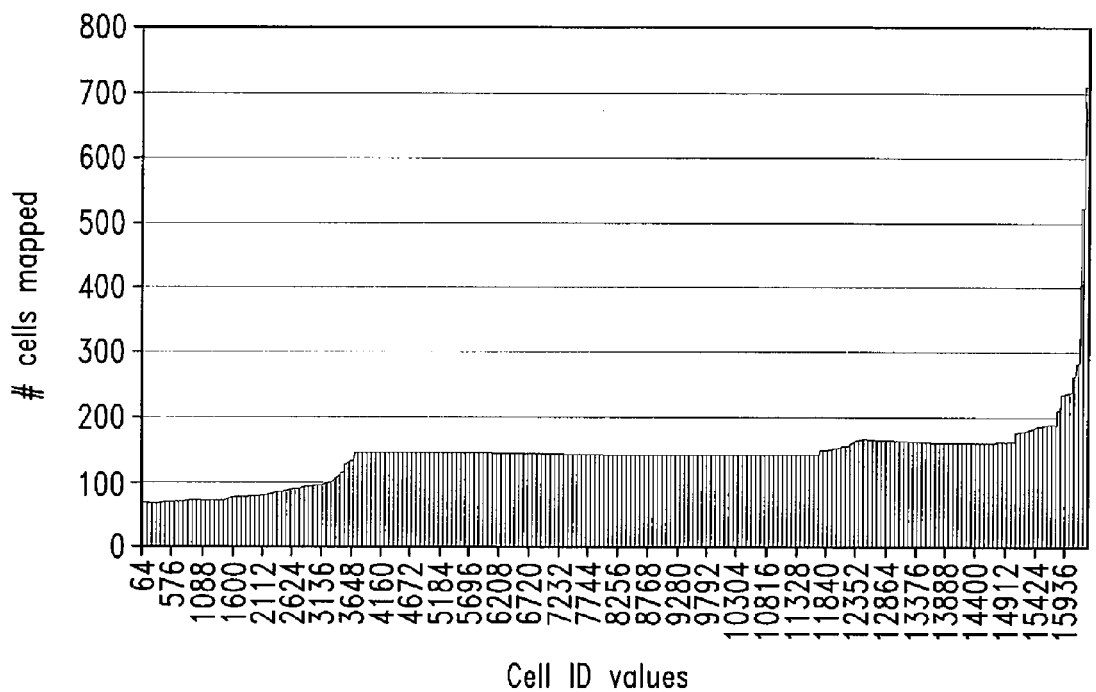
FIG. 10 and FIG. 11 illustrate, by means of histograms, primitive distributions for linear mapping and adaptive mapping, respectively.
Figure 11:
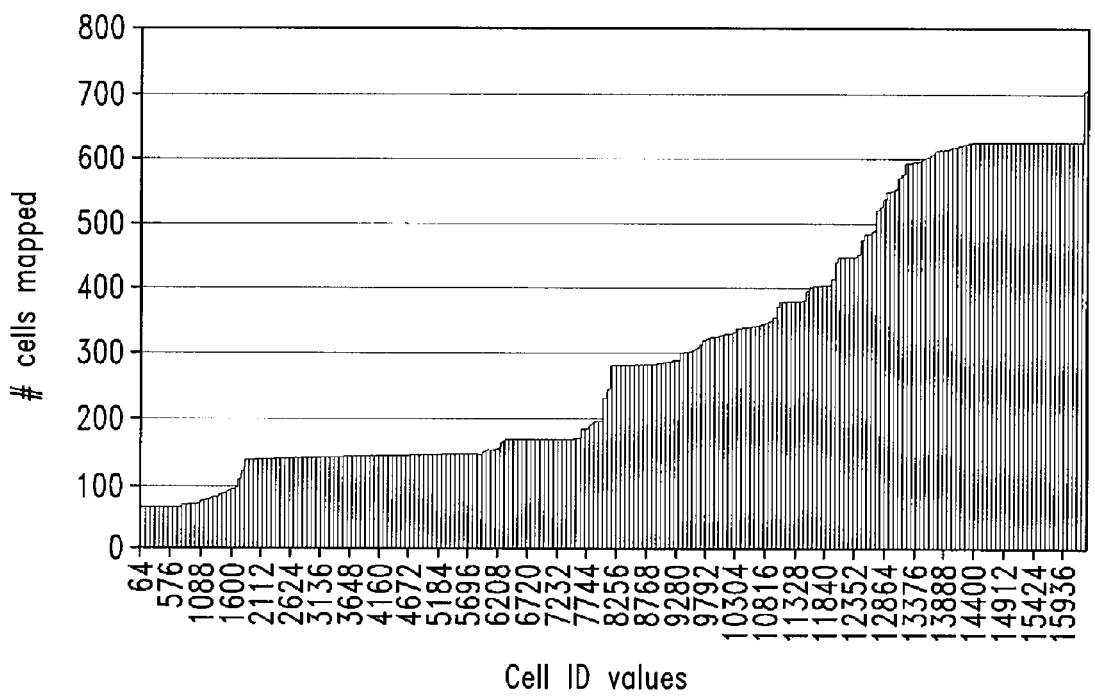

FIG. 10 and FIG. 11 illustrate by means of histograms the behaviors on a Quake III game application for linear mapping (curve I2) and adaptive mapping (piecewise linear I3). The graphs show a cumulative function histogram of the mapping of 720 primitives (see Y axis). Each bar of the graph collects together 64 cells. On X axis there are the computed output cells. In this example M=16384 (there are 16384 cells available).

Using a linear mapping (FIG. 10) it could be noted how the most part of primitives are mapped into last two bars, and around 81% of primitives are mapped into 29% of available cells, whereas using an adaptive mapping (right) approach, 40% of primitives are mapped into 50% of cells. The cells distribution for adaptive mapping (FIG. 10) is more uniform than the one of the linear mapping.

The applicants have tested by means of a computer simulations a method analogous to the one described with reference to FIGS. 5, 6 and 7 and the adaptive mapping algorithm above indicated. The simulations have been made on Quake III, without considering the clearings operations. The Table 1 below shows the results of the simulations by illustrating values of the overdraw factor in several conditions. The column Sorting Enabled refers to the situation in which the steps of FIGS. 5, 6 and 7 have been carried out and the column Sorting Disabled refers to a situation in which the above steps have not been performed. The overdraw factor has been valuated for several games 40Demo 2, 40Demo1, 126Demo1 known to the skilled person.

TABLE 1

|  | Sorting Enabled | Sorting Disabled | Frame # |
|---|---|---|---|
| Overdraw factor | 1.7 | 2 | 40 Demo2 (Quake III) |
| Overdraw factor | 1.2 | 2.7 | 40 Demo1 (Quake III) |
| Overdraw factor | 1.6 | 2.8 | 126 Demo1 (Quake III) |

As clear form Table 1, when the method of FIGS. 5, 6 and 7 was enabled a lower overdraw factor has been obtained.

Now a particular organization of the parser side memory will be described. According to this embodiment, the parser side memory 509 (FIG. 2) is operatively divided into a plurality of memory parts or chunks 120-12N (FIG. 12) storing corresponding portions of the ordered display list. Then, in the parser side memory 509 there are cells associated with more than one chunk.

Figure 12:
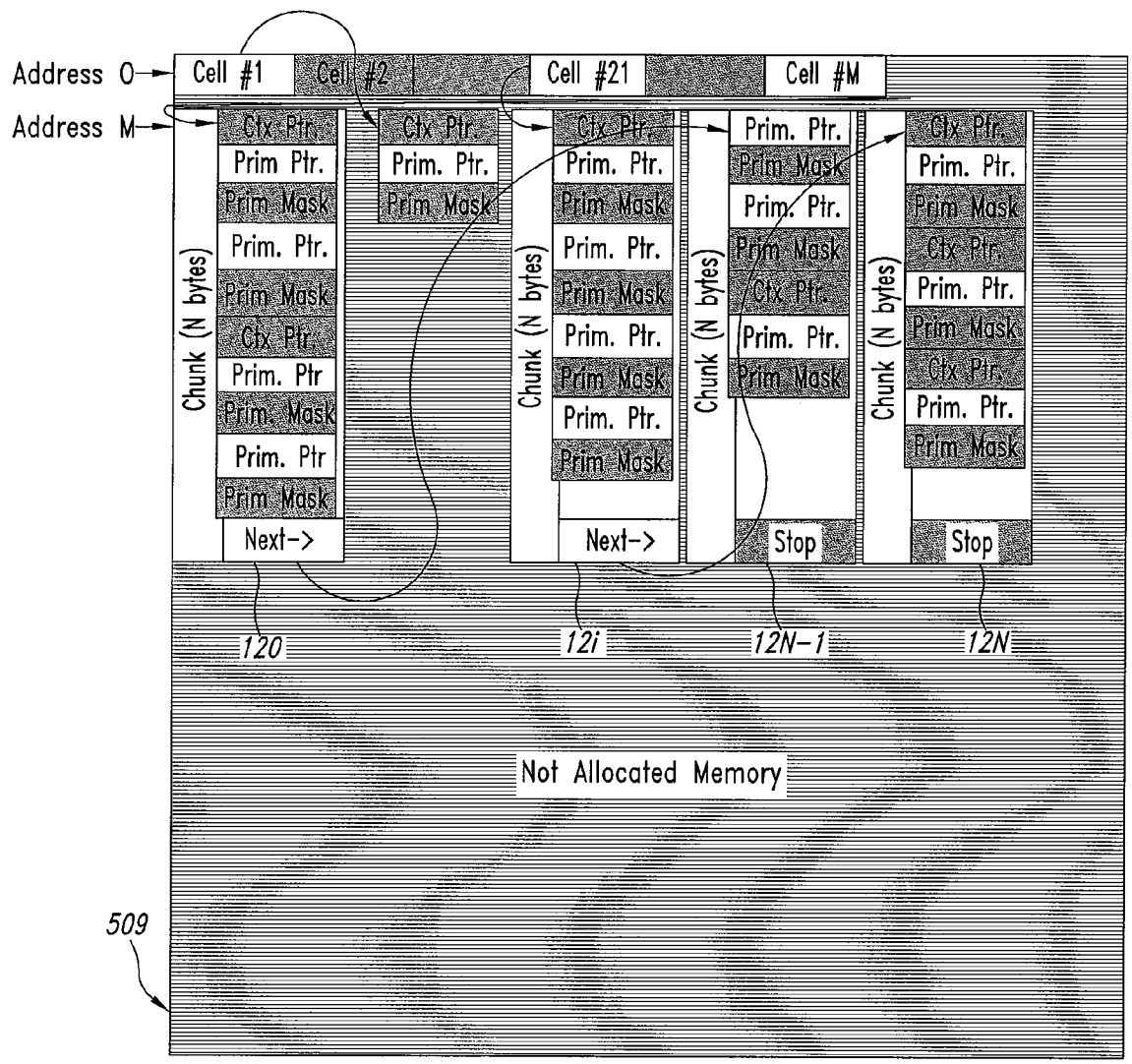
FIG. 12 shows schematically a first organization of a memory employable in said graphic module.

With reference to the particular embodiment of FIG. 12, the parser side memory 509 is adapted to store the ordered display list related to a single tile and includes chunks 120-12N each having, as an example, a size of 32, 64 or 128 bytes. The example illustrated in FIG. 12 shows a chunk 12i associated with a cell having index IDCell 21 (Cell # 21) which includes a code Next addressing another chunk 12N associated with the same cell.

Particularly, the chunk 12i includes the following instruction elements of the display list:
  a STOP instruction used to terminate the display list;
  a NEXT instruction having a data field representing the address at which is allocated the next chunk of the display list;
  Ctx Ptr which is the address into the scene buffer 504 where the context associated with the (next) primitive to render is stored. When encountered, the parser stage 506 sends the context to the underlying rasterizer 507 and fragment processor 508;
  Prim Ptr is the address into the scene buffer where the vertex data and attributes of the primitives to render are stored;
  Prim Mask is a bit field indicating to the parser stage 506 which vertex belongs to the primitive being processed. If the bit i is 1, then the vertex belongs to the primitive being processed, otherwise the vertex doesn't belong to the processed primitive.

As an example, each instruction element n has bits and contains two fields: an identification field of k bits that codes the type of instruction, and a (n-k) bit field that contains the data associated with the instruction. In a particular implementation n=32 and k=4. Hence it is possible to manage up to 16 different instructions within a chunk.

The first M elements of the memory are reserved and statically allocated: they are the heads (entry point addresses) of the display list of each cell. Hence, when a generic cell i needs to be processed, the element stored in position i into the memory is the pointer to the first element of the display list i. This first element stored into the statically allocated memory could be either a STOP (and in this case the display list is empty), or a NEXT, and in this case the display list is not empty and it starts from the address contained inside the data field of the NEXT command.

It is observed that thanks to the mapping, the number of primitives associated with each cell can be different. Therefore, there are cells containing many primitives and other cells which include few primitives or that are empty. The embodiment described with reference to FIG. 12 allows to obtain a dynamic allocation of the parser side memory 509 reaching an efficient exploitation of the parser side memory 509. The dynamic allocation of the memory associated with each cell, in contrast with an approach associating a fixed memory capacity with each cell, reduces the need of flushing out the parser side memory 509 due to the fact that said memory as been completely filled up without storing the whole display list of a tile.

Figure 13:
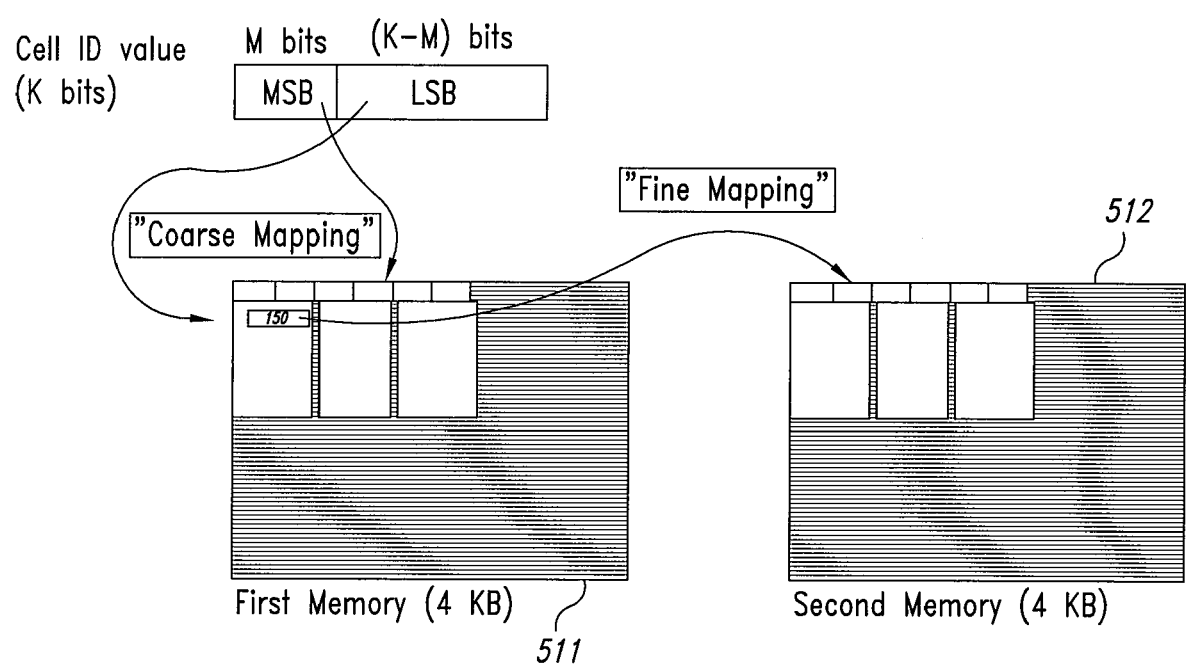
FIG. 13 shows schematically a second organization of a memory employable in said graphic module.

FIG. 13 shows another example of the parser side memory 509 organization. According to this example, the parser side memory 509 includes a first memory portion 511 and a second memory portion 512. The parser stage 506 when creating the ordered display list, first fills up the first memory portion 511 and subsequently, when the first memory portion is full, employs the second memory portion 512. As an example, the first and second memory potions 511 and 512 may have equal sizes such as, for example, 4 KB. Each memory portion 511 and 512 can be organized in chunks as described with reference to FIG. 13.

As described above, the binner stage 503 performs the mapping of a 3D tile into M−1 cells such as, for example, 16384 cells. In a first step, the parser stage 506 operatively groups the M−1 cells in a plurality of M1 macro-cells (for example, M1 is equal to 64) and fills up the first memory portion 511 with a ordered display list based on the M1 macro-cells. In other words, the first memory portion 511 is a memory portion dedicated to a "coarse sorting" cell.

Subsequently, when the parser stage 506 reads a display list related to a macro-cell of the first memory portion 511 it creates another display list with which fills up the second memory portion 512. The second memory portion 512 stores a fine display list which refers to all the cells included in one of the macro-cell of the first memory portion. The first memory portion 511 includes a code addressing the second memory portion.

In accordance with a specific example, the mapping of the primitive (into binner stage 503) is carried out over 16384 cells, using a 14 bit cell ID field. Once primitives are read back by the parser stage 506, the most significant bits (MSB bits) of the cell ID are used to map the first memory portions 511 and obtain a first coarse sorting (or reordering), and the least significant bits (LSB bits) are used for the finest sorting performed into second memory portion 512. The LSB bits to perform the finest mapping needs to be stored inside the first memory portion 510 with the primitive pointer and mask field.

In a preferred implementation, the sorting of the primitives over 16384 "virtual" cells, uses first 6 MSB to address 64 "coarse" cells into the first memory portion 510 (that is 4 Kbytes in size), and 14−6=8 bits to address 256 "fine" cells into the second memory portion 511 (4 KB as well).

Using this implementation, only 3% of first memory portion 511 is reserved for the cells headers pointers, allowing 97% of the space allocatable adaptively for chunks. The second memory portion 512 has 12.5% of space reserved for headers pointers and 87.5% of space free for chunk allocation. This avoids filling up the parser side memory 509 with pointers data. This embodiment allows to increment the number of "virtual" cells, increasing the sorting and rendering performances, employing a parser side memory having reduced size (i.e., keeping the number of physical memory adaptively allocated cell small).

Figure 14:
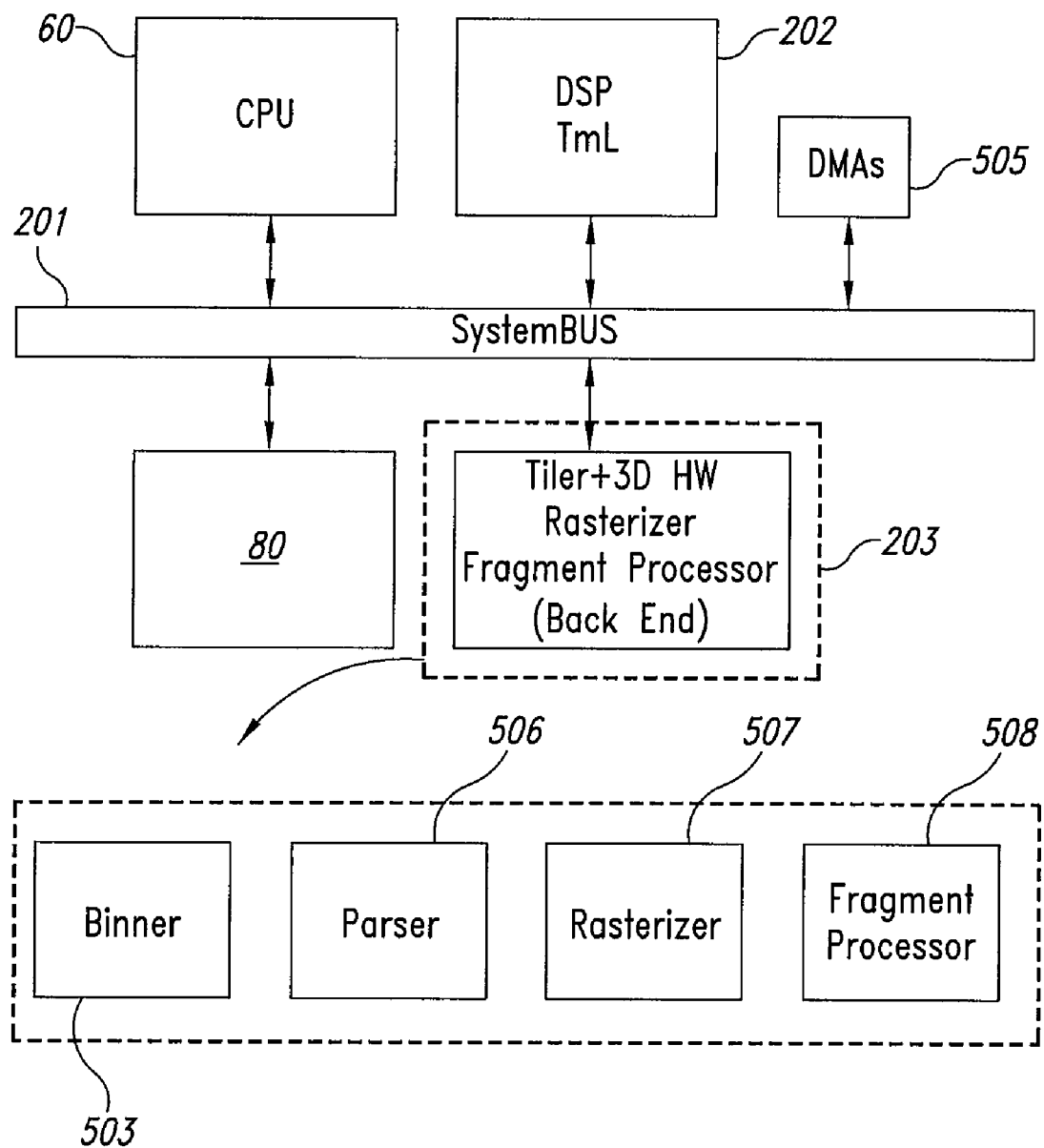
FIG. 14 shows schematically a hardware apparatus employable to implement said graphic module.

FIG. 14 illustrates an apparatus 200 which can be employed to implement the graphic module 500 described with reference to FIGS. 2 and 3. The apparatus 200 includes a system bus 201 which allows the information and data exchange with the CPU 60 (also shown in FIG. 1) and the system memory 80. The CPU 60 allows to perform the function of the driver 501 and can be a ARM 11. The data exchange with the system memory 80 can be managed by suitable interfaces 505 such as DMAs (Direct Memory Access).

Moreover, apparatus 200 is provided with a Multimedia Digital Signal Processor 202 MMDSP+ or ST2xx DSP family processor which can perform the functions of the geometry stage 502. A hardware block 203 is configured to perform the functions of the binner stage 503, parser stage 506, rasterizer stage 507 and fragment processor 508.

As clear from the description of the above examples and embodiments, the teachings of the invention are applicable to any type of graphic systems but they show particular advantages for "embedded" applications such as for graphic applications to be run on systems having limited computing power and memory capacity.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A graphic rendering method, comprising:
providing primitive data representing primitives of a scene;
defining a plurality of three-dimensional cells of a scene view frustum;
ordering the cells according to a cell order based on cell depths from a reference plane;
associating each primitive with a corresponding one of the cells, the associating being performed by one or more configured computing devices and including defining a mapping function by selecting a curve approximating a behavior of cell depths transformed in accordance with a projective transformation; and
processing the primitive data of the primitives according to the cell order to renderize the scene.

2. The method of claim 1 wherein defining a plurality of three-dimensional cells includes:
operatively dividing the view frustum into a plurality of three-dimensional portions having a view frustum depth; and
operatively dividing each portion into plural said plurality of three-dimensional cells.

3. The method of claim 2 wherein said portions are three-dimensional tiles.

4. The method of claim 1 wherein defining a mapping function includes correlating reference depths with cell indexes identifying each cell with a plurality of reference depth values and the associating includes:
defining a reference depth value for each primitive by selecting one of the cell depths; and computing, for each reference depth value, a cell index indicated by the mapping function.

5. The method of claim 4 wherein said cell indexes are integers.

6. The method of claim 4 wherein defining a mapping function includes applying a linear approximation.

7. The method of claim 4 wherein selecting the curve includes:
defining a piecewise linear curve comprising at least one interference point between a first mapping curve and a second mapping curve; the first mapping curve being associated with a first cell index range and the second mapping curve being associated with a second cell index range.

8. The method of claim 7 wherein said interference point has a first coordinate corresponding to a first cell index and a second coordinate corresponding to a first depth value.

9. The method of claim 8, further comprising adjusting coordinates of the interference point basing on a computed distribution of the primitives among the first and the second cell index ranges.

10. The method of claim 9 wherein the said adjusting comprises:
computing a second depth value; and
defining a further piecewise linear curve employing said second depth value.

11. The method of claim 10 wherein the computing the second depth value comprises:
counting a first number of primitives associated with the first cell index range;
counting a second number of primitive associated with the second cell index range; and
computing the second depth value so as to increase the first cell index range when the first number is lower than the second number or computing the second depth value so as to decrease the first cell index range when the first number is higher than the second number.

12. The method according to claim 4, comprising:
storing in a first memory data associated with primitives to be renderized, the data including said cell indexes corresponding to the primitives to be renderized; and
storing in a second memory a displaying list including pointers to said data.

13. The method according to claim 12, wherein the defining a plurality of three-dimensional cells includes:
operatively dividing the view frustum into a plurality of three-dimensional portions having a view frustum depth; and
operatively dividing each portion into plural said plurality of three-dimensional cells, wherein storing in the second memory includes:
associating said second memory with one of said three-dimensional portions;
operatively dividing the second memory in at least first and second memory parts; said memory parts storing corresponding portions of said displaying list; and
associating one of the cells with the first memory part and the second memory part; the first memory part containing a code addressing the second memory part.

14. The method according to claim 12 wherein defining the plurality of three-dimensional cells further includes:
operatively grouping said plurality of cells into a plurality of macro-cells.

15. The method according to claim 14, wherein storing in the second memory includes:
storing in first memory portion of said second memory a first display list based on said macro-cells;
storing in a second memory portion of said second memory a second display list based on cells belonging to one of the macro-cells;
wherein said first memory portion comprises an address code addressing said second memory portion.

16. The method according to claim 15 wherein processing primitives according to the cell order includes:
reading the first display list;
reading the second display list addressed by the first display list.

17. The method according to claim 1 wherein providing primitive data includes providing the primitive data according to a submission order and wherein associating each primitive the corresponding cell further includes applying to each primitive data a test to check whether it is safe to reorder the primitive data.

18. The method according to claim 17 wherein the test is carried out to maintain compliance with an OpenGL ES standard.

19. The method according to claim 17, further comprising:
associating with each primitive an indicator that indicates a result of said test.

20. The method according to claim 1 wherein the method is in accordance with a sort-middle approach.

21. The method according to claim 1 wherein processing the primitive data of the primitives according to the cell order comprises:
defining a first pixel associated with a first primitive;
defining a second pixel associated with a second primitive; the first and the second pixels having associated same coordinates;
displaying on the screen one of said first and second pixels which is not covered by the other one of the first and second pixels.

22. The method according to claim 21, further comprising:
applying a depth test to said first and second pixels based on corresponding depth quantities; the first pixel having a respective depth quantity lower than a dept quantity of the second pixel;
deciding to avoid displaying of the second pixel.

23. A system, comprising:
a screen device structured to display scenes;
a mapping module structured to define a plurality of three-dimensional cells of a scene view frustum ordered according to a cell order based on cell depths of the screen device; the mapping module being structured to associate each primitive to a corresponding cell of a plurality of cells, the associating being based at least in part on a curve approximating a behavior of cell depths transformed in accordance with a projective transformation; and
a processing module structured to process primitives according to the cell order and render the scene.

24. The system of claim 23 wherein the mapping module is configured to:
operatively divide the view frustum into a plurality of three-dimensional portions having a view frustum depth; and
operatively divide each portion into cells.

25. The system of claim 23 wherein said processing module is configured to apply a depth test and avoid displaying a pixel overlapped by another pixel.

26. The system of claim 23 wherein said mapping module is structured to apply a safe test in order to select first primitives to be mapped and second primitives to be forwarded to the processing module without undergoing mapping.

27. The system of claim 26 wherein said test checks whether a primitive is associated with a depth reference value.

28. The system of claim 26 wherein said test checks whether a depth test is enabled by the processing module.

29. The system of claim 23 wherein said mapping module is structured to store in a memory an unordered display list containing primitive data associated with cell indexes identifying the cells corresponding to the primitives.

30. The system of claim 29 wherein said processing module is structured to read said first memory and generate, by employing said cell indexes, an ordered display list to be stored in a second memory; the ordered display list including pointers to primitive data.

31. The system of claim 23, further including a geometry stage structured to provide primitive data to said mapping module.

32. The system of claim 23 wherein said processing module includes a rasterizer for performing processing of the primitive data so as to generate pixel information representing images.

33. The system of claim 32 wherein said processing module includes a fragment processor structured to define fragments from pixels received from said rasterizer.

34. The system of claim 23 wherein said system is one of the following systems: a mobile telephone, a play station, a PDA, a game console, a car navigation system, a set top box.

35. A graphic module, comprising:
one or more computing devices configured to implement,
a first module structured to define a plurality of three-dimensional cells of a scene view frustum and order the cells according to a cell order based on cell depths from a reference plane; the first module being configured to associate each primitive of a scene to be displayed with a single cell, the associating being based at least in part on a curve approximating a behavior of cell depths transformed in accordance with a projective transformation; and
a second module structured to process primitives according to the cell order and render the scene.

36. The graphic module of claim 35 wherein said second module is configured to apply a depth test and avoid displaying a pixel overlapped by another pixel.

37. The graphic module of claim 35 wherein said second module is structured to process primitives starting from primitives associated with a cell having lower depth up to the primitives associated with a cell having greater depth.

38. The graphic module of claim 35 wherein said graphic module is configured to operate according a sort-middle technique.

39. The graphic module of claim 35, further comprising a geometry stage including:
a transformation stage structured to apply geometry transformation to input primitive data;
a lighting stage for applying a light effect to primitive data received from the transformation stage; and
a culling stage for removing primitives oriented in a direction opposite to an observer of the scene.

* * * * *